US012432387B2

(12) United States Patent
Chen et al.

(10) Patent No.: US 12,432,387 B2
(45) Date of Patent: Sep. 30, 2025

(54) METHODS AND APPARATUSES OF SYNTAX SIGNALING AND REFERENCING CONSTRAINT IN VIDEO CODING SYSTEM

(71) Applicant: MEDIATEK INC., Hsinchu (TW)

(72) Inventors: Ching-Yeh Chen, Hsinchu (TW);
Yu-Wen Huang, Hsinchu (TW);
Chih-Wei Hsu, Hsinchu (TW);
Tzu-Der Chuang, Hsinchu (TW);
Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 355 days.

(21) Appl. No.: 17/608,226

(22) PCT Filed: Apr. 30, 2020

(86) PCT No.: PCT/CN2020/088222
§ 371 (c)(1),
(2) Date: Nov. 2, 2021

(87) PCT Pub. No.: WO2020/224525
PCT Pub. Date: Nov. 12, 2020

(65) Prior Publication Data
US 2022/0256201 A1 Aug. 11, 2022

Related U.S. Application Data

(60) Provisional application No. 62/845,963, filed on May 10, 2019, provisional application No. 62/842,677, filed on May 3, 2019.

(51) Int. Cl.
*H04N 19/82* (2014.01)
*H04N 19/117* (2014.01)
(Continued)

(52) U.S. Cl.
CPC .......... *H04N 19/82* (2014.11); *H04N 19/117* (2014.11); *H04N 19/136* (2014.11);
(Continued)

(58) Field of Classification Search
CPC ............... H04N 19/117; H04N 19/136; H04N 19/186; H04N 19/61; H04N 19/70; H04N 19/82; H04N 19/96
See application file for complete search history.

(56) References Cited

U.S. PATENT DOCUMENTS 9,137,547 B2 9/2015 Van der Auwera et al.
9,270,990 B2 2/2016 Lee et al.
(Continued)

FOREIGN PATENT DOCUMENTS

CN 103096054 A 5/2013
CN 103370936 A 10/2013
(Continued)

OTHER PUBLICATIONS

"Adaptive Loop Filtering for Video Coding"—Tsai et al., IEEE Journal of Selected Topics in Signal Processing, vol. 7, No. 6, Dec. 2013. (Year: 2013).*

(Continued)

*Primary Examiner* — Mainul Hasan
(74) *Attorney, Agent, or Firm* — McClure, Qualey & Rodack, LLP

(57) ABSTRACT

Encoding methods and apparatuses comprise determining parameters of a specific process for a current slice, signaling in one or more Adaptive Parameter Sets (APSs), performing the specific process using the parameters, signaling an APS ID of each signaled APS in a slice header, and encoding the current slice. Each APS is classified into a category according to a type of data carried by the APS. The APS ID of each signaled APS is counted in a category associated with the (Continued)

specific process and is independent of other categories. Decoding methods and apparatuses comprise parsing an APS ID of each referenced APS from a slice header of a current slice for a specific process, determining parameters from each referenced APS according to the parsed APS ID and a category associated with the specific process, performing the specific process on the current slice and decoding the current slice.

12 Claims, 5 Drawing Sheets

(51) Int. Cl.
*H04N 19/136* (2014.01)
*H04N 19/174* (2014.01)
*H04N 19/186* (2014.01)
*H04N 19/159* (2014.01)
*H04N 19/70* (2014.01)

(52) U.S. Cl.
CPC ......... *H04N 19/174* (2014.11); *H04N 19/186* (2014.11); *H04N 19/159* (2014.11); *H04N 19/70* (2014.11)

(56) References Cited

U.S. PATENT DOCUMENTS

| | | | |
|---|---|---|---|
| 9,872,015 | B2 | 1/2018 | Fu et al. |
| 2012/0207227 | A1 | 8/2012 | Tsai et al. |
| 2013/0136167 | A1 | 5/2013 | Chong et al. |
| 2013/0259118 | A1 | 10/2013 | Fu et al. |
| 2017/0013261 | A1 | 1/2017 | Lin et al. |
| 2020/0344473 | A1* | 10/2020 | Seregin ................ H04N 19/117 |
| 2021/0314579 | A1* | 10/2021 | Hu ........................ H04N 19/103 |
| 2021/0385446 | A1* | 12/2021 | Liu ....................... H04N 19/132 |
| 2022/0132110 | A1* | 4/2022 | Paluri .................... H04N 19/70 |
| 2022/0150481 | A1* | 5/2022 | Kim ........................ H04N 19/82 |
| 2022/0174295 | A1* | 6/2022 | Paluri .................. H04N 19/186 |
| 2024/0040154 | A1* | 2/2024 | Laroche ............... H04N 19/174 |
| 2024/0146919 | A1* | 5/2024 | Paluri .................. H04N 19/184 |

FOREIGN PATENT DOCUMENTS

| | | |
|---|---|---|
| CN | 103959794 A | 7/2014 |
| CN | 104054339 A | 9/2014 |
| EP | 2 753 079 A1 | 7/2014 |

OTHER PUBLICATIONS

"On Cross Component Adaptive Loop Filter for Video Compression"—Kiran Misra, Frank Bossen, Andrew Segall; 978-1-7281-4704-8/19/$31.00 A © 2019 IEEE (Year: 2019).*

International Search Report and Written Opinion dated Jul. 30, 2020, issued in application No. PCT/CN2020/088222.

Chinese language office action dated May 20, 2021, issued in application No. TW 109114616.

Korean language office action dated Apr. 11, 2024, issued in application No. KR 10-2021-7037415.

Bross, B., et al.; "Versatile Video Coding (Draft 5);" Joint Video Experts Team (JVET) of ITU-T SG 16 WP 3 and ISO/IEC JTC 1/SC 29/WG 11; Mar. 2019; pp. 1-371.

Hu, N., et al.; "Coding tree block based adaptive loop filter;" Joint Video Experts Team (JVET) of ITU-T SG 16 WP 3 and ISO/IEC JTC 1/SC 29/WG 11; Jan. 2019; pp. 1-12.

* cited by examiner

MxM            M/2xM          MxM/2          M/2xM/2

M/4xM (L)      M/4xM (R)      MxM/4 (U)      MxM/4 (D)

METHODS AND APPARATUSES OF SYNTAX SIGNALING AND REFERENCING CONSTRAINT IN VIDEO CODING SYSTEM

CROSS REFERENCE TO RELATED APPLICATIONS

The present invention claims priority to U.S. Provisional Patent Application, Ser. No. 62/842,677, filed on May 3, 2019, entitled "Adaptive loop filter Syntax in adaptive parameter set and slice header", and U.S. Provisional Patent Application, Ser. No. 62/845,963, filed on May 10, 2019, entitled "syntax in adaptive parameter set and slice header". The U.S. Provisional Patent Applications are hereby incorporated by reference in their entireties.

FIELD OF THE INVENTION

The present invention relates to video data processing methods and apparatuses for video encoding or video decoding. In particular, the present invention relates to syntax signaling and a constraint applied for data or parameter referencing in a video encoding or decoding system.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). A coded picture is represented by one or a collection of slices, each slice includes an integer number of CTUs. The individual CTUs in a slice are processed according to a raster scanning order. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree partitioning method to adapt to various local motion and texture characteristics. An example of the quadtree block partitioning structure for splitting a CTU into multiple CUs is illustrated in FIG. 1, where the solid lines indicate CU boundaries in CTU 100.

The prediction decision is made at the CU level, where each CU is either coded by inter picture prediction or intra picture prediction. Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After obtaining a residual signal generated by the prediction process, residual data of the residual signal belong to a CU is split into one or more Transform Units (TUs) according to a Residual QuadTree (RQT) block partitioning structure for transforming the residual data into transform coefficients for compact data representation. The dashed lines in FIG. 1 indicate TU boundaries. The TU is a basic representative block for applying transform and quantization on the residual signal in the encoding process. For each TU, a transform matrix having the same size as the TU is applied to the residual signal to generate the transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma, Y) CTB, two chrominance (chroma, Cb and Cr) CTBs, and its associated syntax elements. In the HEVC system, the same quadtree block partitioning structure is generally applied to both luma and chroma components unless a minimum size for chroma block is reached.

Joint Video Expert Team (WET) of ITU-T and ISO/IEC are currently in the process of establishing the next-generation video coding standard Versatile Video Coding (VVC). An Adaptive Parameter Set (APS) was adopted into VVC Test Model 4 (VTM 4) and data carried in each APS can be shared across and referenced by multiple pictures or slices. Each APS has an unique identifier (ID) and is used to identify which APS is referenced by a current picture or slice when an APS ID is included in a picture header of the current picture or a slice header of the current slice. In VTM4, each APS contains one set of Adaptive Loop Filter (ALF) parameters, and up to 32 APSs can be used during video encoding or decoding. A tile group or a slice can re-use the ALF information from an APS to reduce the overhead. The 32 APSs are updated as a first-in-first-out (FIFO) buffer. In a CTB based ALF scheme, when an ALF operation is applied to a luma CTB, the choice among 5 temporal or 1 signaled ALF filter sets is selected by the video encoder and indicated by signaling a filter set index in the encoded bitstream. The filter set index is signaled for indicating the selected ALF filter set. For each slice, only one new set of 25 ALF filters can be signaled. If a new set of ALF filters is signaled for a current slice, all luma CTBs in the current slice share this new set of ALF filters. When an ALF operation is applied to a chroma CTB, if a new ALF filter set is signaled for a current slice, the chroma CTB uses the new ALF filter set; otherwise, a most recent temporal chroma filter satisfying the temporal scalability constraint is applied. As for the slice-level temporal filter, the APSs are updated as a FIFO buffer and the FIFO indices are used to identify the reference of a temporal filter. The syntax design associated with the ALF information signaled in an APS is shown in Table 1, and the syntax design associated with the ALF syntax at CTU-level is shown in Table 2.

Two flags, alf_signal_new_filter_luma and alf_signal_new_filter_chroma, are signaled in each APS as shown in Table 1. These two flags are also referred to newLumaFilterFlag and newChromaFilterFlag in the description, and these two flags are signaled in an APS to indicate whether the luma ALF parameters and chroma ALF parameters are existed in this APS respectively.

TABLE 1

| | Descriptor |
|---|---|
| alf_data( ) { | |
|   alf_chroma_idc | tu(v) |
|   alf_signal_new_filter_luma | u(1) |
|   if( alf_signal_new_filter_luma > 0 ) { | |
|     alf_luma_use_fixed_filter_flag | u(1) |
|     if(alf_luma_use_fixed_filter_flag){ | |
|       alf_luma_fixed_filter_set_index | tb(v) |
|       alf_luma_fixed_filter_usage_pattern | u(1) |
|       if (alf_luma_fixed_filter_usage_pattern > 0) | |
|         for (i = 0; i < NumAlfFilters; i++) | |
|           alf_luma_fixed_filter_usage[i] | u(1) |
|     alf_num_available_temporal_filter_sets_luma | tb(1) |
|     alf_luma_num_filters_signalled_minus1 | tb(v) |
|   } | |
|   if ( alf_chroma _idc > 0 ) { | |
|   alf_signal_new_filter_chroma | u(1) |
|   if (alf_signal_new_filter_chroma){ | |
|     alf_chroma_min_eg_order_minus1 | tu(v) |
|   } | |
|   } | |
| } | |

TABLE 2

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_alf_enable_flag ){ | |
|     alf_ctb_flag[ 0 ][ xCtb >> Log2CtbSize ][ yCtb >> Log2CtbSize ] | ae(v) |
|     if (alf_ctb_flag[ 0 ][ xCtb >> Log2CtbSize ][ yCtb >> Log2CtbSize ] { | |
|       coding_alf_ctu_filter_set_index(CtbAddrInRs ) | |
|     } | |
|   } | |
|   if( alf_chroma _idc = = 1 \|\| alf_chroma _idc = = 3 ) | |
|     alf_ctb_flag[ 1 ][ xCtb >> Log2CtbSize ][ yCtb >> Log2CtbSize ] | ae(v) |
|   if( alf_chroma _idc = = 2 \|\| alf_chroma_idc = = 3 ) | |
|     alf_ctb_flag[ 2 ][ xCtb >> Log2CtbSize ][ yCtb >> Log2CtbSize ] | ae(v) |
|   } | |
|   if( slice_type = = I && qtbtt_dual_tree_intra_flag ) { | |
|     dual_tree_implicit_qt_split ( xCtb, yCtb, CtbLog2SizeY, 0 ) | |
|   else | |
|     coding_quadtree( xCtb, yCtb, CtbLog2SizeY, 0, SINGLE_TREE ) | |
| } | |
| coding_alf_ctu_filter_set_index(CtbAddrInRs, slice_type ){ | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   alf_use_new_filter | ae(1) |
|     if (alf_use_new_filter == 0){ | |
|       alf_use_fixed_filter | ae(1) |
|   } | |
|   if (alf_use_new_filter){ | |
|     alf_luma_ctb_filter_set_index[xCtb >> Log2CtbSize ][ yCtb >> Log2CtbSize ] = 16 | |
|   } | |
|   else if (alf_use_fixed_filter){ | |
|     alf_fixed_filter_index | tb(v) |
|     alf_luma_ctb_filter_set_index[xCtb >> Log2CtbSize ][ yCtb >> Log2CtbSize ] = alf_fixed_filter_index | |
|   } | |
|   else{ | |
|     alf_temporal_index | tb(v) |
|     alf_luma_ctb_filter_set_index[xCtb >> Log2CtbSize ][ yCtb >> Log2CtbSize ] = 16 + alf_temporal_index | |
|   } | |

The ALF filtering process In VTM3 is described in the following. A filter result of the ALF filtering process is filtered output samples, and a filtered output sample O(x, y) at a position (x, y) is generated by input samples I(i+1, j+1) and corresponding filter coefficients w(i,j) according to Equation (1). In practice, the ALF filtering process is implemented using integer arithmetic for fixed point precision computations as shown in Equation (2).

$$O(x, y) = \sum_{(i,j)} w(i, j) \cdot I(x + i, y + j) \quad \text{Equation (1)}$$

$$O(x, y) = \left( \sum_{i=-\frac{L}{2}}^{\frac{L}{2}} \sum_{j=-\frac{L}{2}}^{\frac{L}{2}} w(i, j) \cdot I(x + i, y + j) + 64 \right) \gg 7 \quad \text{Equation (2)}$$

where L denotes a filter length of the ALF filtering process, and where w(i, j) are the filter coefficients in fixed point precision. Equation (1) may be reformulated as shown in Equation (3) without coding efficiency loss.

$$O(x, y) = I(x, y) + \Sigma_{(i,j) \neq (0,0)} w(i, j) \cdot (I(x+i, y+j) - I(x, y)) \quad \text{Equation (3)}$$

where w(i, j) are the same filter coefficients as in equation (1), except for w(0, 0), which is equal to 1 in equation (3) while it is equal to $1 - \Sigma_{(i,j) \neq (0,0)} w(i, j)$ in equation (1).

A non-linearity may be introduced in Equation (3) to make the ALF filtering process more efficient by using a simple clipping function to reduce the impact of neighbor sample values I(i+1, j+1) when this neighbor sample value and a current sample value I(i,j) being filtered are very different. The ALF filtering process is thus modified as shown in Equation (4).

$$O'(x, y) = I(x, y) + \Sigma_{(i,j) \neq (0,0)} w(i, j) \cdot K(I(x+i, y+j) - I(x, y), k(i, j)) \quad \text{Equation (4)}$$

where K(d, b)=min(b, max(−b, d)) is the clipping function, and k(i, j) are clipping parameters, which depends on the (i, j) filter coefficient. The encoder performs an optimization calculation to find the best clipping parameters k(i, j).

In an implementation of the ALF filtering process, the clipping parameters k(i, j) are specified for each ALF filter, one clipping value is signaled per filter coefficient. A total of 12 clipping values are signaled in the video bitstream for each luma filter and 6 clipping values are signaled for each chroma filter. The clipping values are encoded in a slice header using a $k^{th}$ exponential-Golomb code corresponding to the index of the clipping value in the filter set. Corresponding clipping values are signaled only when a non-center coefficient is non-zero. The filter coefficients have to be reconstructed before decoding the clipping value. The syntax table is illustrated in Table 3.

TABLE 3

|  | Descriptor |
|---|---|
| alf_data( ) { |  |
|   alf_chroma_idc | tu(v) |
|   alf_luma_clip | u(1) |
|   if( alf_choma_idc ) |  |
|     alf_chroma_clip | u(1) |
|   alf_luma_num_filters_signalled_minus1 | tb (v) |
|   if( alf_luma_num_filters_signalled_minus1 > 0 ) { |  |
|     for( filtIdx = 0; filtIdx < NumAlfFilters; filtIdx++ ) |  |
|       alf_luma_coeff_delta_idx[ filtIdx ] | tb (v) |
|   } |  |
|   alf_luma_coeff_delta_flag | u(1) |
|   if ( !alf_luma_coeff_delta_flag && alf_luma_num_filters_signalled_minus1 > 0 ) |  |
|     alf_luma_coeff_delta_prediction_flag | u(1) |
|   alf_luma_min_eg_order_minus1 | ue (v) |
|   for( i = 0; i < 3; i++ ) |  |
|     alf_luma_eg_order_increase_flag[ i ] | u(1) |
| if ( alf_luma_coeff_delta_flag ) { |  |
|     for( sigFiltIdx = 0; sigFiltIdx <= alf_luma_num_filters_signalled_minus1; sigFiltIdx++ ) |  |
|       alf_luma_coeff_flag[ sigFiltIdx ] | u(1) |
|   } |  |
|   for( sigFiltIdx = 0; sigFiltIdx <= alf_luma_num_filters_signalled_minus1; sigFiltIdx++ ) { |  |
|     if ( alf_luma_coeff_flag[ sigFiltIdx ] ) { |  |
|       for ( j = 0; j < 12; j++ ) { |  |
|         alf_luma_coeff_delta_abs[ sigFiltIdx ][ j ] | uek(v) |
|         if( alf_luma_coeff_delta_abs[ sigFiltIdx ][ j ] ) |  |
|           alf_luma_coeff_delta_sign[ sigFiltIdx ][ j ] | u(1) |
|       } |  |
|     } |  |
|   } |  |
|   if( alf_luma_clip ) { |  |
|     alf_luma_clip_min_eg_order_minus1 | ue(v) |
|     for( i = 0; i < 3; i++ ) |  |
|       alf_luma_clip_eg_order_increase_flag[ i ] | u(1) |
|     for ( sigFiltIdx = 0; sigFiltIdx <= alf_luma_num_filters_signalled_minus1; sigFiltIdx++ ) |  |
|   { |  |
|     if ( alf_luma_coeff_flag[ sigFiltIdx ] ) { |  |
|       for ( j = 0; j < 12; j++ ) { |  |
|         if( filterCoefficients[ sigFiltIdx ][ j ] ) |  |
|           alf_luma_clip_idx[ sigFiltIdx ][ j ] | uek(v) |
|       } |  |
|     } |  |
|   } |  |
| } |  |
| if ( alf_chroma_idc > 0 ) { |  |
|   alf_chroma_min_eg_order_minus1 | ue(v) |
|   for( i = 0; i < 2; i++ ) |  |
|     alf_chroma_eg_order_increase_flag[ i ] | u(1) |
|   for( j = 0; j < 6; j++ ) { |  |
|     alf_chroma_coeff_abs[ j ] | uek(v) |
|     if( alf_chroma_coeff_abs[ j ] > 0 ) |  |
|       alf_chroma_coeff_sign[ j ] | u(1) |
|   } |  |
| } |  |
| if ( alf_chroma_idc > 0 && alf_chroma_clip ) { |  |
|   alf_chroma_clip_min_eg_order_minus1 | ue(v) |
|   for( i = 0; i < 2; i++ ) |  |
|     alf_chroma_clip_eg_order_increase_flag[ i ] | u(1) |
|   for( j = 0; j < 6; j++ ) { |  |
|     if( alf_chroma_coeff_abs[ j ] ) |  |
|       alf_chroma_clip_idx[ j ] | uek(v) |
|   } |  |
| } |  |
| } |  |

BRIEF SUMMARY OF THE INVENTION

Methods of processing video data in a video encoding system receive input data associated with a current slice, determine parameters of a specific process for the current slice, signal the parameters of the specific process in one or more Adaptive Parameter Sets (APSs) in a category associated with the specific process, perform the specific process on one or more blocks in the current slice using the parameters of the specific process, signal an APS Identifier (ID) of each APS referenced by the current slice in a slice header of the current slice, and encode the current slice. The one or more APSs are to be referenced by the current slice for performing the specific process. Each available APS is classified into one of multiple categories according to a type of data carried by the APS. All APSs in one category have a same APS parameter type, and the APS parameter type of a current APS is signaled in the current APS. The APS ID of each APS referenced by the current slice is counted in the category associated with the specific process only and is independent of other categories.

Some embodiments of the specific process include an Adaptive Loop Filter (ALF) process for a luma component, an ALF process for chroma components, a Luma Mapping Chroma Scaling (LMCS) process, and any process requires data or parameters signaled in one or more APSs. For example, the parameters of the ALF process for the luma component are signaled in one or more APSs in a category associated with the ALF process for the luma component, similarly, the parameters of the ALF process for the chroma components are signaled in one or more APSs in a category associated with the ALF process for the chroma components. In another example, the parameters of the LMCS process are signaled in one or more APSs in a category associated with the LMCS process. In one embodiment, the APS ID of each APS referenced by the current slice is signaled in a slice header of the current slice or a picture header of a current picture, where the current slice is in the current picture. An embodiment of the video encoding system further checks if each APS referenced by the current slice includes corresponding data or parameters for the specific process, and modifies or removes the APS ID of any APS without corresponding data or parameters from the slice header of the current slice.

Methods of processing video data in a video decoding system receive input data associated with a current slice, parse an APS ID of each referenced APS from a slice header of the current slice for performing a specific process, determine each referenced APS according to the parsed APS ID and a category associated with the specific process, determine parameters of the specific process for the current slice by referencing one or more referenced APSs, perform the specific process on one or more blocks in the current slice using the parameters, and decode the current slice. Each available APS is classified into one of multiple categories according to a data type of data carried in the APS, and the APS ID of one APS is counted in the category only and is independent of other categories.

The specific process may be an ALF process for a luma component, an ALF process for chroma components, and a LMCS process. For example, the parameters of the ALF process for the luma component are determined by referencing one or more APSs in a category associated with the ALF process for the luma component, and the parameters of the ALF process for the chroma components are determined by referencing one or more APSs in a category associated with the ALF process for the chroma components. The parameters of the LMCS process are determined by referencing one or more APSs in a category associated with the LMCS process. All APSs in one category have a same APS parameter type and the APS parameter type of each referenced APS is parsed from the referenced APS. Each referenced APS is searched by the APS ID parsed from the slice header and the APS parameter type associated with the specific process. For example, each reference APS for a LMCS process is searched from a LMCS category by the parsed APS ID. In one embodiment, the APS ID of each referenced APS is parsed from a slice header of the current slice or a picture header of a current picture, where the current slice is in the current picture. In some embodiments, the video decoding system further checks if each referenced APS includes corresponding data or parameters for the specific process, and disables the specific process for a processing unit when there is a referenced APS not having corresponding data or parameters. Some examples of the processing unit include one block, one CU, one CTB, one region in the current slice, and the entire current slice. In one embodiment, the processing unit is a unit for switching filter parameters.

Some embodiments of video encoding or decoding method implemented in a video coding system receive input data associated with a current slice, determine ALF filter parameters of a specific color component for the current slice by referencing one or more ALF APSs, perform an ALF process on the specific color component in the current slice using the ALF filter parameters, and encode or decode the current slice. At least one filter parameter flag signaled in or parsed from each APS is equal to one, where each filter parameter flag indicates whether a type of ALF filter parameters is signaled in the APS. Each ALF APS carries at least one type of ALF filter parameters. For example, one or both of flags alf_luma_filter_signal_flag and alf_chroma_filter_signal_flag are signaled in or parsed from each ALF APS. The flag_alf_luma_filter_signal_flag signaled in an ALF APS indicates whether luma filter parameters are signaled in the ALF APS and the flag alf_chroma_filter_signal_flag signaled in an ALF APS indicates whether chroma filter parameters are signaled in the ALF APS. The video decoding method determines the filter parameters by parsing an APS ID of each referenced ALF APS from a slice header of the current slice. The video encoding method encodes the current slice comprising signaling an APS ID of each referenced ALF APS in a slice header of the current slice. In some embodiments, an ALF APS includes both the luma filter parameters and chroma filter parameters when both the flags alf_luma_filter_signal_flag and alf_chroma_filter_signal_flag are equal to one. In another embodiment, the flag alf_chroma_filter_signal_flag in an ALF APS is conditionally signaled according to the flag alf_luma_filter_signal_flag in the ALF APS. The flag alf_chroma_filter_signal_flag is signaled in the ALF APS to indicate the existence of the chroma filter parameters when the flag alf_luma_filter_signal_flag is equal to one, and the flag alf_chroma_filter_signal_flag is not signaled and is inferred to be equal to one when the flag alf_luma_filter_signal_flag is equal to zero. In yet another embodiment, only one of luma and chroma filter parameters can be signaled in one ALF APS. The specific color component is a luma component Y, a chroma component Cb, a chroma component Cr, or a combination thereof.

Aspects of the disclosure further provide an apparatus for the video encoding system encoding video data by receiving input data of a current slice, determining parameters of a specific process for the current slice by referencing one or more APSs only in a category associated with the specific process, performing the specific process on one or more blocks in the current slice using the parameters of the specific process, signaling an APS ID of each referenced APS in a slice header of the current slice, and encoding the current slice. Each APS is classified into one of multiple categories according to a data type of data carried by the APS, and the APS ID of each referenced APS is counted in the category associated with the specific process only and is independent of other categories. An apparatus for the video decoding system decodes video data by receiving input data of a current slice, parsing an APS ID of each referenced APS from a slice header of the current slice for performing a specific process, determining each referenced APS according to the parsed APS ID and a category associated with the specific process, determining parameters of the specific process for the current slice by referencing one or more referenced APSs, performing the specific process on one or more blocks in the current slice using the parameters, and decoding the current slice. Each APS is classified into one of multiple categories according to a data type of data carried in the APS, and the APS ID of one APS is counted in the category only and is independent of other categories. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
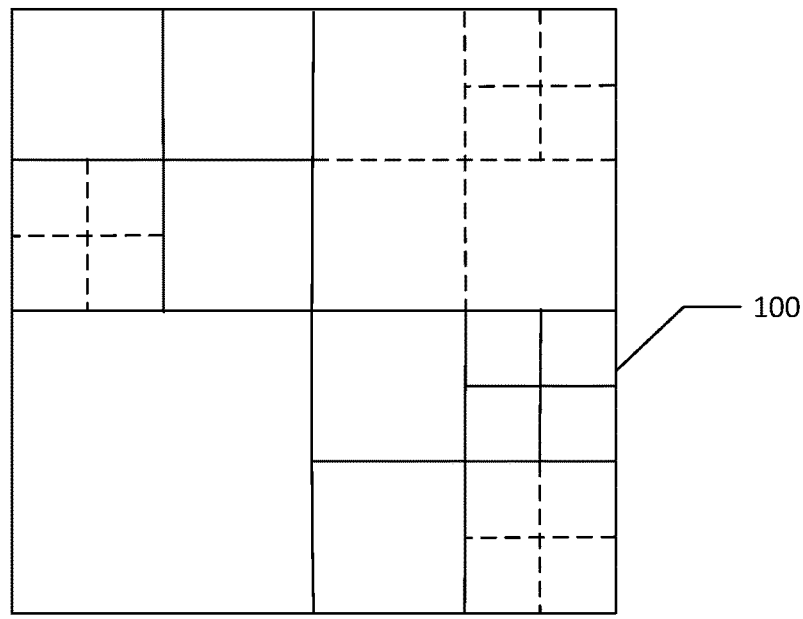
FIG. 1 illustrates an exemplary coding tree for splitting a Coding Tree Unit (CTU) into Coding Units (CUs) and splitting each CU into one or more Transform Units (TUs) according to quadtree splitting defined in the HEVC standard.
Figure 2:
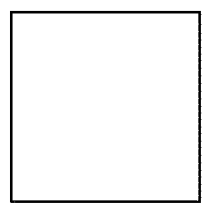
FIG. 2 illustrates eight different Prediction Unit (PU) partition types for splitting a CU into one or more PUs according to the HEVC standard.
Figure 2:
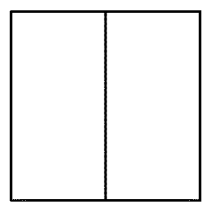
Figure 2:
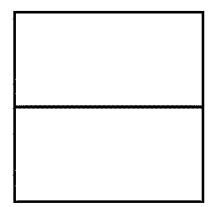
Figure 2:
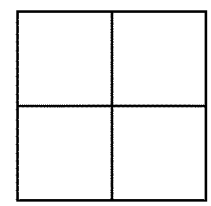
Figure 2:
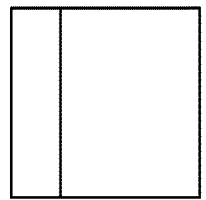
Figure 2:
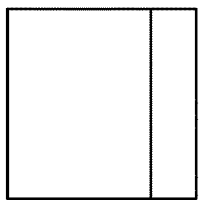
Figure 2:
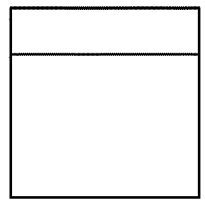
Figure 2:
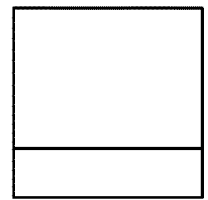

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

In VTM-5.0 of the VVC standard, each APS is classified into one of three categories according to an APS parameter type of the APS. The three APS parameter types are ALF APS type, LMCS_APS type, and reserved type. The APS parameter type of a current APS specifies the type of parameters carried in the current APS, that is, ALF parameters are signaled in the current APS when the APS parameter type is ALF_APS type and Luma Mapping Chroma Scaling (LMCS) parameters are signaled in the current APS when the APS parameter type is LMCS_APS type. Table 4 illustrates an APS carries one type of parameters according to the APS parameter type aps_params_type, the APS includes ALF data if aps_params_type is ALF_APS type, otherwise, the APS includes LMCS data if aps_params_type is LMCS_APS type.

TABLE 4

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( adaptation_parameter_set_id ) | |
|   else if( aps_params_type = = LMCS_APS ) | |
|     lmcs_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

As shown in Table 5, a flag slice_alf_enabled_flag signaled in a slice header of a current slice specifies whether the ALF filtering process is enabled for the current slice, and a syntax element slice_num_alf_aps_ids_luma specifies the number of APSs carrying ALF parameters that the current slice refers to for the luma ALF process. If there is one or more APS referenced by the current slice for the luma ALF process, the Identifier (ID) slice_alf_aps_id_luma [i] of each APS referenced by the current slice for performing the luma ALF process is then signaled in the slice header and used to indicate which APSs are referenced in the luma ALF process. The ID slice_alf_aps_id_chroma of an APS referenced by the current slice for performing the chroma ALF process is also signaled in the slice header. Similarly, the ID slice_lmcs_aps_id of an APS referenced by the current slice for performing the LMCS process is signaled in the slice header if the LMCS process is enabled. The ID range is shared by all the APSs regardless of the APS parameter types. For example, there are 32 APSs having APS IDs equal to 0 to 31, some APSs belong to an ALF category as these APSs carry ALF parameters, some APSs belong to a LMCS category as these APSs carry LMCS parameters, while some APSs belong to a reserved category.

TABLE 5

| | Descriptor |
|---|---|
| if( sps_alf_enabled_flag ) { | |
|   slice_alf_enabled_flag | u(1) |
|   if( slice_alf_enabled_flag ) { | |
|     slice_num_alf_aps_ids_luma | tb(v) |
|     for( i = 0; i < slice_num_alf_aps_ids_luma; i++ ) | |
|       slice_alf_aps_id_luma[ i ] | u(5) |
|     if( ChromaArrayType != 0 ) | |
|       slice_alf_chroma_idc | tu(v) |
|     if( slice_alf_chroma_idc && ( slice_type != I \|\| slice_num_alf_aps_ids_luma != 1 ) ) | |
|       slice_alf_aps_id_chroma | u(5) |
|   } | |
| } | |
| ... | |
| if( sps_lmcs_enabled_flag ) { | |
|   slice_lmcs_enabled_flag | u(1) |
|   if( slice_lmcs_enabled_flag ) { | |
|     slice_lmcs_aps_id | u(5) |
|     if( !( qtbtt_dual_tree_intra_flag && slice_type = = I ) ) | |
|       slice_chroma_residual_scale_flag | u(1) |
| } | |

APS ID Counted Independently in Each Category In VTM5.0, Adaptive Loop Filter (ALF) parameters are no longer signaled in slice headers, but signaled in Adaptive Parameter Sets (APSs). As previously described, up to 32 APSs are used during the encoding and decoding process, and these 32 APSs carry different types of information but all share the same Identifier (ID) range. For example, some of the 32 APSs carry Adaptive Loop Filter (ALF) parameters and some other APSs carry Luma Mapping Chroma Scaling (LMCS) parameters. Each slice may reference one or more APSs for a particular process by incorporating one or more APS IDs in the slice header. Similarly, one or more APSs may be referenced by a current video picture for a particular process by incorporating one or more APS IDs in a picture header. For example, when a video decoder is performing an ALF process on a current slice, one or more referenced APSs are determined for the ALF process according to the APS IDS signaled in the slice header. The video decoder then retrieves corresponding ALF parameters from each referenced APS. It is possible for a current slice or a current video picture to reference an APS for acquiring parameters needed for a particular process but the APS does not have the corresponding parameters. For example, the APS referenced by one slice or video picture for the ALF process may be one empty filter set or the APS may not include the corresponding ALF parameters. An undefined decoding process caused by referencing an APS without corresponding parameters introduces one ambiguity and therefore is undesirable. Various embodiments of the present invention described in the following paragraphs aim to avoid the undefined decoding process.

In some exemplary embodiments of the present invention, APSs with different APS parameter types are classified into multiple categories. For a performing a specific process on a current slice or video picture, only the APSs in the corresponding category can be referenced for acquiring data or parameters for the specific process. For example, there are three APS categories, APSs in the first category carry parameters for the LMCS process, APSs in the second category carry parameters for the ALF process performed on the luma component, and APSs in the third category carry parameters for the ALF process performed on the chroma components. Only those APSs in the LMCS category can be referenced by one slice for acquiring parameters for the LMCS process. Similarly, only those APSs in the ALF luma category can be referenced by one slice for acquiring parameters for performing the ALF process on the luma component. Only those APSs in the ALF chroma category can be referenced by one slice for acquiring parameters for performing the ALF process on the chroma components. The APS ID of one APS is counted in one category only, and be independent of other categories. An APS parameter type is signaled in each APS indicating which category this APS is belonging to. For example, the APS parameter type signaled in an APS is ALF if this APS carries ALF parameters, the APS parameter type signaled in an APS is LMCS if the APS carries LMCS parameters, and the APS parameter type signaled in an APS is SCALING if the APS carries scaling list parameters.

The ID range is not shared by all available APSs as the ID of an APS is counted in one category and is independent of other categories. In one exemplary embodiment, the value of the APS ID falls within the range of 0 to 7 inclusive if the APS parameter type is ALF or SCALING, and the value of the APS ID falls within the range of 0 to 3 inclusive if the APS parameter type is LMCS. In this embodiment, at most 8 APSs carrying ALF parameters can be referenced by a current slice or a current picture, at most 8 APSs carrying scaling list parameters can be referenced by the current slice or the current picture, and at most 4 APSs carrying LMCS parameters can be referenced by the current slice or the current picture. According to this exemplary embodiment, when at least one block in a current slice references an APS for performing a specific process, not only the APS ID is used to search for the APS, both the APS ID and the APS parameter type are needed to search for the APS. For example, a video decoder processes a block in a current slice by the LMCS process using LMCS parameters signaled in an APS with an APS ID equal to 2. There are up to 3 APSs having an APS ID equal to 2, one APS carries ALF parameters, one APS carries scaling list parameters, and another APS carries LMCS parameters. The decoder selects the APS in the category associated with the specific process, in this example, the decoder selects the APS with an APS ID equals to 2 and an APS parameter type associated with the LMCS process. According to the embodiments, the undefined decoding process is avoided by counting APS ID independently in each category so the video decoder only obtains parameters for a specific process from APSs belong to the category associated with the specific process.

Referenced APS Must Include Corresponding Parameters In some embodiments of the present invention, no matter the APS IDs are counted in all categories as all APSs share the same ID range or the APS IDs are counted independently in each category, an encoder normative constraint is added to prevent the undefined decoding process caused by referencing an APS without corresponding parameters. This encoder normative constraint restricts one APS referenced by one slice or video picture for performing a specific process on one or more color components has to include corresponding data or parameters for the one or more color components. The specific process may be an ALF process for the luma component, an ALF process for the chroma components, or an LMCS process. For example, an APS has to contain luma filter parameters if this APS is referenced by a slice and used to perform the luma ALF process on one or more blocks in the slice. An APS cannot be referenced by any slice for the luma ALF process if this APS does not have any luma filter parameter. Similarly, an APS has to contain chroma filter parameters if this APS is referenced by a slice and used to perform the chroma ALF process on one or more blocks in the slice. An APS cannot be referenced by any slice for the chroma ALF process if this APS does not have any chroma filter parameter. In this embodiment, the video encoder may check each APS referenced for a specific process to ensure corresponding data or parameters for the specific process are included in the reference APS. For example, the video encoder checks parameters contained in each APS or the APS parameter type of each APS referenced for a specific process, and if the APS does not have corresponding parameters or the APS parameter type is not associated with the specific process, the APS ID of this APS is modified or removed from the slice header of the current slice.

In this embodiment, a video bitstream is deemed as an invalid bitstream if a slice header or picture header of any slice or video picture includes an APS ID for a particular process associated with an APS which does not have corresponding parameters for the particular process. All video encoders have to follow the encoder normative constraint to generate a legal bitstream, so the video decoders are able to decode the legal bitstream correctly as the syntax design is complied with the encoder normative constraint. In cases when any syntax is skipped in the bitstream, both encoders and decoders set the syntax value as an inferred value to guarantee the encoding and decoding results are matched.

The encoder normative constraint may be applied to ensure LMCS parameters are existed in a referenced APS when performing an LMCS process according to an embodiment of the present invention. In one embodiment, at least one APS ID is signaled in or parsed from a slice header of a current slice when the LMCS process is allowed and enabled, and each APS ID indicates which APS is referenced by the current slice for performing the LMCS process. The encoder normative constraint restricts the APS parameter type of the APS referenced for the LMCS process to be LMCS. The encoder normative constraint in this embodiment prevents an undefined decoding process caused by referencing an APS for the LMCS process without LMCS parameters. The APS referenced by one slice for a specific process such as the LMCS process must include corresponding data and parameters for the specific process. An embodiment of a video encoder checks if each APS referenced by a current slice for performing the LMCS process includes LMCS parameters, and modifies the APS ID of any APS without LMCS parameters or removes the APS ID of any APS without LMCS parameters from the slice header of the current slice. Video encoders have to follow the encoder normative constraint so as to generate a legal bitstream, and video decoders are able to decode the legal bitstream correctly as the syntax design is complied with the encoder normative constraint. When any syntax is skipped in the bitstream, both encoders and decoders set the syntax value as an inferred value to guarantee the encoding and decoding results are matched.

Fallback Mode in Decoders Some embodiments of the present invention adds one fallback mode in the decoder side. If an APS does not include corresponding parameters and is referenced by a current slice or video picture to perform a specific process for one or more color components, the specific process is disabled for a processing unit in the current slice or video picture when this APS is referenced for performing the specific process on this processing unit. The processing unit may be one block, one Coding Unit (CU), one Coding Tree Block (CTB), one region in the current slice, or the entire current slice. The processing unit is a unit which can switch filter parameters according to an embodiment. Some examples of the specific process include an ALF process for a luma component, an ALF process for chroma components, and a LMCS process. For example, if one APS includes luma filter parameters only but it is referenced to perform the chroma ALF process for a processing unit in one slice, then the chroma ALF process for the processing unit is disabled. Similarly, if one APS includes chroma filter parameters only but it is referenced to perform the luma ALF process for a processing unit in one slice, then the luma ALF process for the processing unit is disabled. If the luma filter parameters in this APS should be used for one luma CTB, then the ALF process for this luma CTB is also disabled. If only the luma filter parameters in this APS can be used for the luma component in one slice, then the luma ALF process in this slice is disabled.

A fallback mode can also be applied to the LMCS process according to an embodiment of the present invention to solve the decoding process ambiguity. At least one APS ID is signaled in or parsed from a slice header of a current slice for the LMCS process when the LMCS process is allowed and enabled in the current slice, where the APS ID indicates which APS is referenced in the LMCS process. If the APS parameter type of the referenced APS is not LMCS or corresponding syntaxes of LMCS does not exist in this referenced APS, the LMCS process is disabled for the slice. That is, when one APS referenced by one slice for a specific process does not include corresponding data or type for the specific process, then the specific process in this slice is disabled.

Disallow Signaling an Empty APS Some embodiments of the present invention add an encoder normative constraint to guarantee that each APS contains some useful parameters to be referenced. In VTM5.0, ALF parameters are moved from slice headers to APSs. For example, there are two flags alf_luma_filter_signal_flag and alf_chroma_filter_signal_flag, or also known as newLumaFilterFlag and newChromaFilterFlag, signaled in each APS (for example, each ALF APS) to indicate whether luma filter parameters (for example, luma ALF filter parameters) and chroma filter parameters (for example, chroma ALF filter parameters) are signaled in this APS respectively. If both flags in an APS (for example, an ALF APS) are all equal to zero, it means no filter parameter is signaled in this APS. Some embodiments of the present invention prevent signaling an empty APS. An embodiment forces signaling luma filter parameters (for example, luma ALF filter parameters) in each APS (for example, each ALF APS). For example, the flag used to indicate whether luma filter parameters (for example, luma ALF filter parameters) are existed in the APS (for example, ALF APS), alf_luma_filter_signal_flag or newLumaFilterFlag, may be removed from each APS (for example, each ALF APS). Luma filter parameters (for example, luma ALF filter parameters) are always signaled in each APS (for example, each ALF APS) according to this embodiment. Chroma filter parameters (for example, chroma ALF filter parameters) are conditionally signaled in the APS (for example, ALF APS) according to a control flag, alf_chroma_filter_signal_flag or newChromaFilterFlag. An APS (for example, an ALF APS) carries both luma and chroma filter parameters (for example, luma and chroma ALF filter parameters) when this control flag alf_chroma_filter_signal_flag or newChromaFilterFlag is equal to one.

In another embodiment, the flag used to indicate whether the chroma filter parameters (for example, chroma ALF filter parameters) are existed in the APS (for example, ALF APS), alf_chroma_filter_signal_flag or newChromaFilterFlag, is conditionally signaled according to the value of alf_luma_filter_signal_flag or newLumaFilterFlag. In cases when newLumaFilterFlag of an APS (for example, ALF APS) is equal to one, newChromaFilterFlag is signaled in the APS (for example, ALF APS) to indicate the existence of the chroma filter parameters (for example, chroma ALF filter parameters). In cases when the flag newLumaFilterFlag of an APS (for example, ALF APS) is equal to zero, the flag newChromaFilterFlag is not signaled and is inferred to be equal to one. This ensures chroma filter parameters (for example, chroma ALF filter parameters) are signaled in this APS (for example, ALF APS) if luma filter parameters (for example, luma ALF filter parameters) are not present.

In some embodiments, an encoder normative constraint is added to guarantee that at least one filter parameter flag, such as alf_luma_filter_signal_flag and alf_chroma_filter_signal_flag, or newLumaFilterFlag and newChromaFilterFlag, in each APS (for example, ALF APS) is equal to one. Each filter parameter flag signaled in an APS (for example, an ALF APS) indicates whether a type of filter parameters (for example, ALF filter parameters) is signaled in this APS (for example, ALF APS). The encoder normative constraint is applied only to ALF APSs belonging to the ALF category according to an embodiment. That is, encoders cannot generate an APS (for example, an ALF APS) having an APS parameter type (for example, an APS parameter type associated with the ALF process) with all filter parameter flags (for example, newLumaFliterFlag, newChromaFilterFlag, alf_luma_filter_signal_flag, alf_chroma_filter_signal_flag, alf_cc_cb_filter_signal_flag, and alf_cc_cr_filter_signal_flag, any other filter parameter flag or combination thereof) equal to zero. In some embodiments for ALF, this bitstream conformance requirement ensures each ALF APS carrying at least one type of ALF filter parameters; for example, each ALF APS carries ALF parameters for one or more color components. In one example, the encoder normative constraint restricts at least one of the values of four filter parameter flags alf_luma_filter_signal_flag, alf_chroma_filter_signal_flag, alf_cc_cb_filter_signal_flag, and alf_cc_cr_filter_signal_flag in an ALF APS belong to an ALF category is equal to one. The value of the flag alf_luma_filter_signal_flag equals to one specifying that a luma filter set is signaled in the ALF APS, and equals to zero specifying that a luma filter set is not signaled in the ALF APS. The value of the flag alf_chroma_filter_signal_flag equals to one specifying that a chroma filter set is signaled in the ALF APS, and equals to zero specifying that a chroma filter set is not signaled in the ALF APS. The flags alf_cc_cb_filter_signal_flag and alf_cc_cr_filter_signal_flag specify whether cross-component cb filter parameters and cross-component cr filter parameters are signaled in the ALF APS respectively.

In yet another embodiment, luma and chroma ALF filter parameters (for example, luma and chroma ALF filter parameters) are signaled in different APSs (for example, in different ALF APSs) separately. Only one type of luma and chroma filter parameters exists in one APS (for example, ALF APS), and a syntax signaled in the APS, such as APS_type, is used to indicate which type of filter parameters are included in the APS. For example, only luma filter parameters exist in an APS (for example, an ALF APS) when the syntax APS_type signaled in the APS is equal to ALF_luma, and only chroma filter parameters exist in an APS (for example, an ALF APS) when the syntax APS_type signaled in the APS is equal to ALF_chroma. In this embodiment, the flags indicating whether luma or chroma filter parameters are included in the APS (for example, ALF APS), such as newLumaFilterFlag and newChromaFilterFlag, or alf_luma_filter_signal_flag and alf_chroma_filter_signal_flag can be removed (for example, removed from the ALF APS).

Representative Flowcharts for Exemplary Video Encoding and Decoding System

Figure 3:
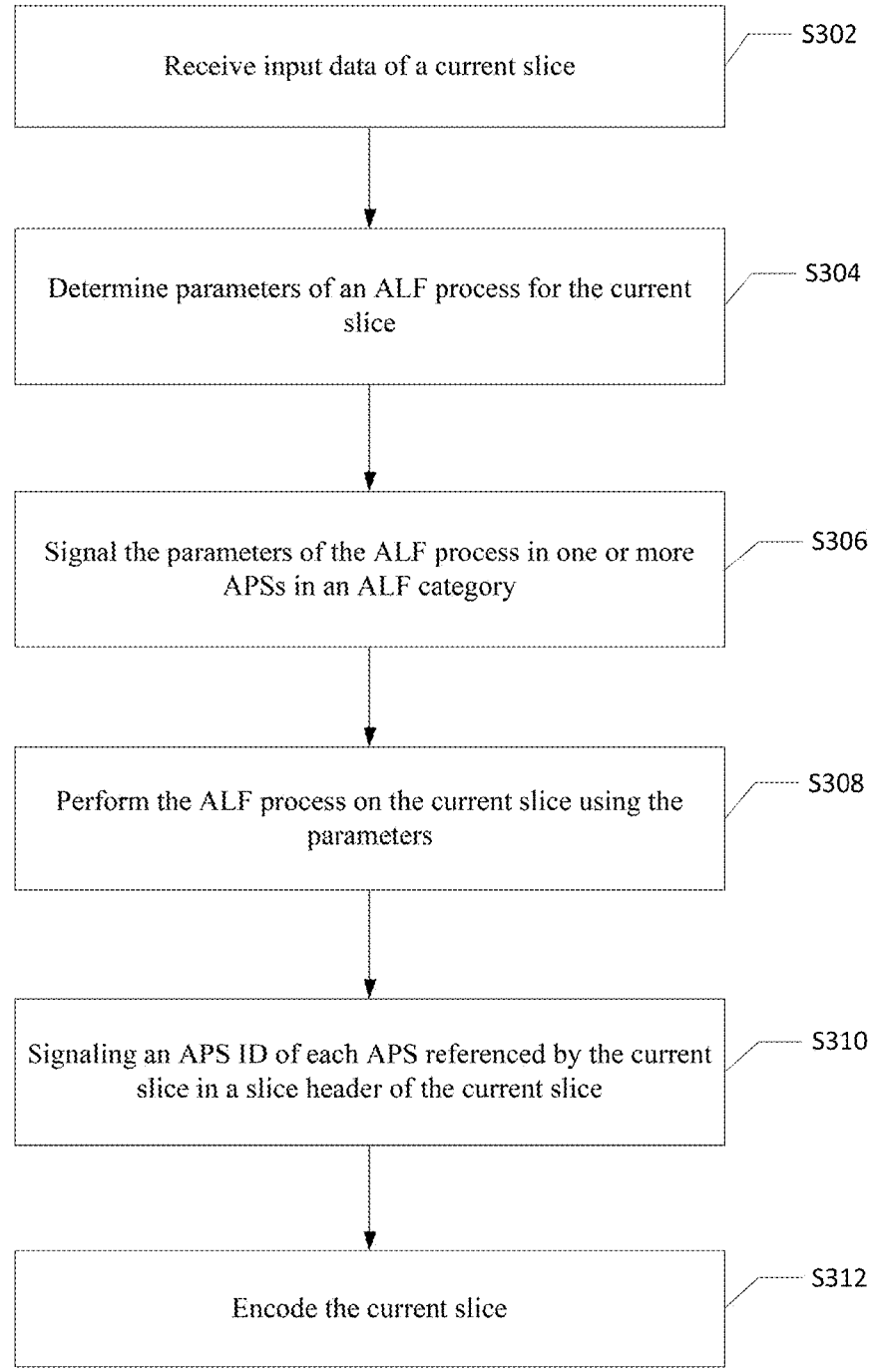
FIG. 3 is a flowchart illustrating an embodiment of the present invention for encoding video data of a current slice by referencing one or more Adaptive Parameter Sets (APSs) for a specific process.

FIG. 3 is a flowchart illustrating some exemplary embodiments of the present invention for encoding a current slice by a video encoding system. Input data associated with a current slice is received by the video encoding system in step S302. FIG. 3 demonstrates an embodiment of filtering reconstructed data of the current slice with an ALF process and ALF parameters are signaled in one or more APSs. The ALF process is for filtering a luma component, chroma components, or both the luma and chroma components of the current slice after reconstruction. The ALF process in this embodiment is an example of a specific process which requires referencing data or parameters from one or more APSs. Another example of the specific process is the LMCS process. The video encoding system determines ALF parameters for the current slice in step S304, and signals the ALF parameters in one or more APSs in an ALF category in step S306. In this embodiment, the ALF parameters are associated with a luma component, chroma components, or both the luma and chroma components. These APSs containing the ALF parameters will be referenced by the current slice for performing the ALF process in the video decoding system. Each available APS is classified into one of multiple categories according to a type of data carried by the APS. For example, some APSs are in the ALF category as these APSs carry ALF parameters while some other APSs are in a LMCS category as those APSs carry LMCS parameters. In step S308, the ALF parameters determined in step S304 are used for performing the ALF process on one or more blocks in the current slice. The ALF process is an in-loop filtering process generating filtered pictures and the filtered pictures are stored in a reference picture buffer for inter prediction of later pictures in an encoding order. The video encoding system signals an APS ID of each APS to be referenced by the current slice in a slice header of the current slice in step S310. In this embodiment, the APS ID of each APS to be referenced by the current slice is counted in the ALF category only and be independent of other categories. That is the counting of the APS IDs is not shared by all APSs. The current slice is encoded in step S312. In some embodiments, an APS parameter type of one APS is signaled in the APS, and all APSs in one category have the same APS parameter type. An APS parameter type is signaled in each APS to indicate the type of data carried by the APS. In this embodiment, each APS in the ALF category has an APS parameter type associated with the ALF process. In one embodiment, the APS ID of each APS to be referenced by the current slice is signaled in a slice header of the current slice or a picture header of a current picture depends on a syntax element signaled in a Picture Parameter Set (PPS). The video encoding system may check each APS to be referenced by the current slice to ensure every APS includes corresponding data or parameters when the video encoding system is signaling the APS ID in the slice header. In cases when there is an APS to be referenced by the current slice does not carry corresponding data or parameters, the video encoding system modifies this APS ID or removes this APS ID from the slice header.

Figure 4:
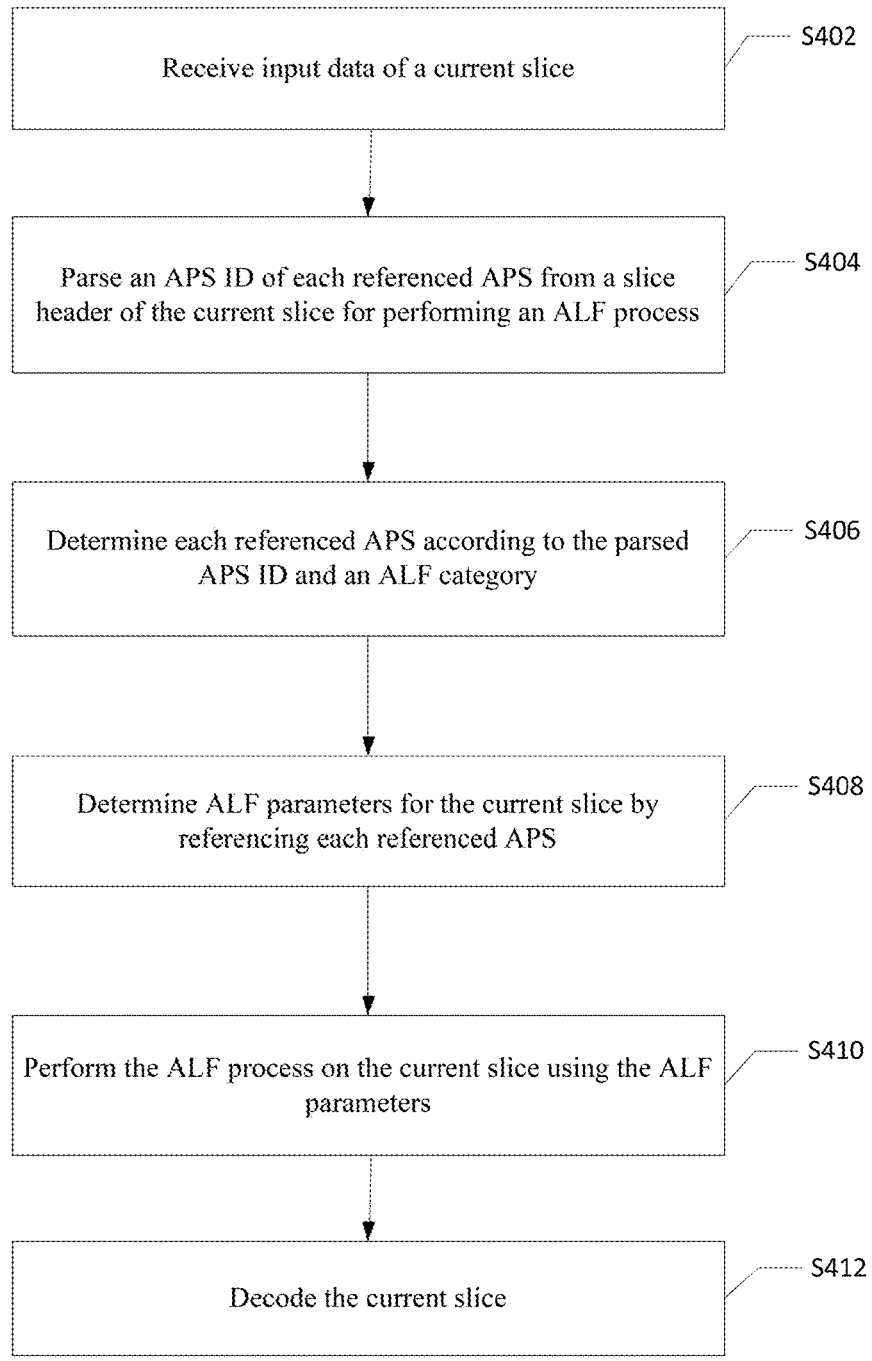
FIG. 4 is a flowchart illustrating an embodiment of the present invention for decoding video data of a current slice by referencing one or more APSs for a specific process.

FIG. 4 is a flowchart illustrating embodiments of the present invention for decoding a current slice by a video decoding system. Input data associated with a current slice is received by the video decoding system in step S402. FIG. 4 demonstrates embodiments of filtering reconstructed data of the current slice with an ALF process, where the ALF process is for filtering a luma component, chroma components, or both the luma and chroma components after reconstruction. The ALF process in this embodiment is an example of a specific process which requires referencing data or parameters from one or more APSs, and another example of the specific process is the LMCS process. In step S404, the video decoding system parses an APS ID of each referenced APS from a slice header of the current slice for performing the ALF process. The APS ID of one APS is counted in one category and is independent of other categories. An APS parameter type signaled in each APS indicates which category the APS is belong to. For example, only the APSs with an APS parameter type equal to ALF are in the ALF category and can be referenced for the ALF process. Each reference APS is determined according to both the parsed APS ID and an APS parameter type in step S406. In this embodiment, the APS parameter type is ALF as the specific process is the ALF process. In step S408, the video decoding system determines ALF parameters for the current slice from each referenced APSs. The ALF process is performed on one or more blocks in the current slice using the ALF parameters in step S410, and the current slice is decoded in step S412. In one embodiment, the APS ID of each referenced APS for the current slice is parsed from a slice header o the current slice or a picture header of a current picture. In some embodiments of the video decoding system, each referenced APS for a specific process is checked to ensure including corresponding data or parameters. The video decoding disables the specific process for a processing unit if there is a referenced APS not having corresponding data or parameters. The processing unit may be one block, one CU, one CTB, one region in the current slice, or the entire current slice. The processing unit is a unit for switching filter parameters in one embodiment.

Figure 5:
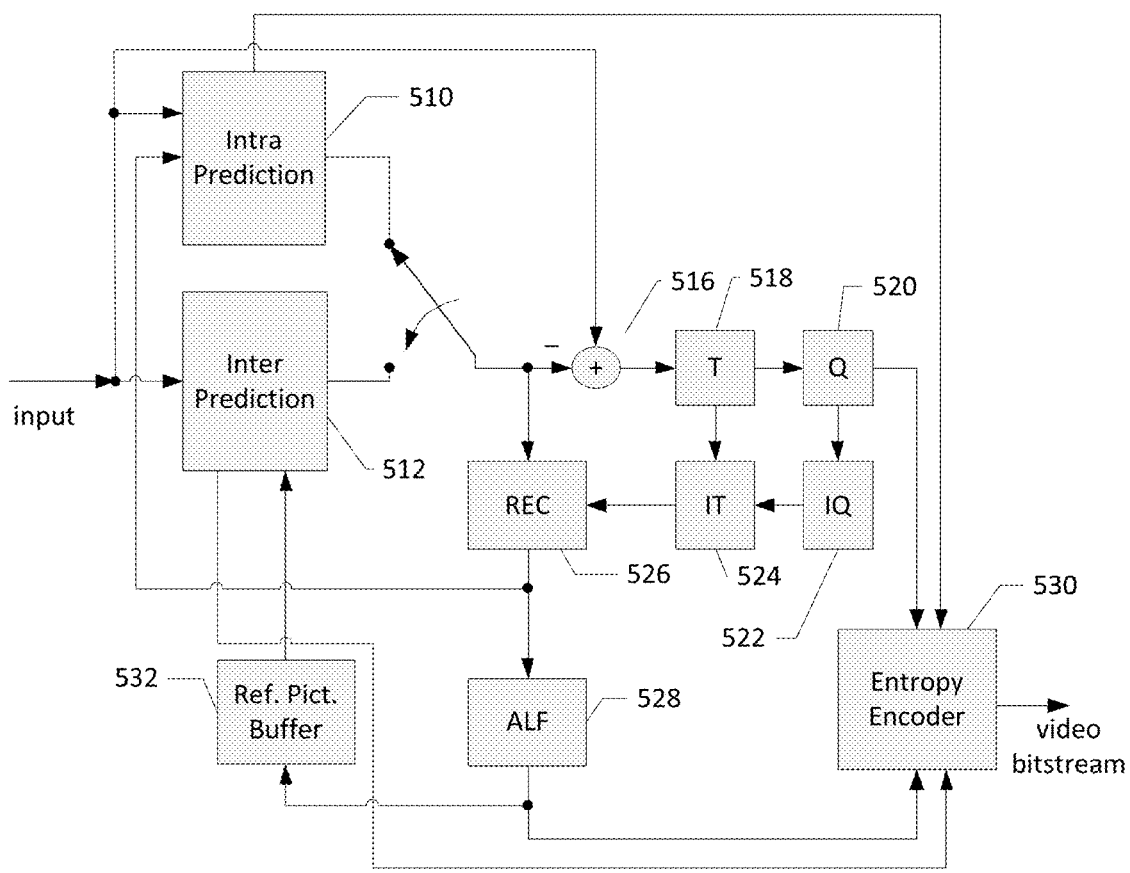
FIG. 5 illustrates an exemplary system block diagram for a video encoding system incorporating the video data processing method according to embodiments of the present invention.

Representative System Block Diagrams FIG. 5 illustrates an exemplary system block diagram for a Video Encoder 500 implementing embodiments associated with the ALF process. Intra Prediction module 510 provides intra predictors based on reconstructed video data of a current picture. Inter Prediction module 512 performs Motion Estimation (ME) and Motion Compensation (MC) to provide predictors based on referencing video data from other picture or pictures. Either Intra Prediction module 510 or Inter Prediction module 512 supplies the selected predictor to Adder 516 to form residues. The residues of the current block are further processed by Transformation module (T) 518 followed by Quantization module (Q) 520. Quantization module 520 receives scaled transform coefficients of each transform block from Transformation module 518, and applies a quantization processing to generate a transformed and quantized residual signal. The transformed and quantized residual signal is then encoded by Entropy Encoder 530 to form a video bitstream. The video bitstream is then packed with side information. The transformed and quantized residual signal of the current block is processed by Inverse Quantization module (IQ) 522 and Inverse Transformation module (IT) 524 to recover the prediction residues. As shown in FIG. 5, the residues are recovered by adding back to the selected predictor at Reconstruction module (REC) 526 to produce reconstructed video data. The reconstructed video data may be stored in Reference Picture Buffer (Ref. Pict. Buffer) 532 and used for prediction of other pictures. The reconstructed video data from REC module 526 may be subject to various impairments due to the encoding processing, consequently, Adaptive Loop Filter (ALF) 528 is applied to the reconstructed video data before storing in the Reference Picture Buffer 532 to further enhance picture quality. ALF parameters for a current slice or a current picture are signaled in one or more APSs belong to an ALF category. An APS ID of each APS referenced for performing the ALF process is signaled in a slice header of the current slice or a picture header of the current picture. The APS ID of each APS referenced by the current slice is counted in the ALF category only and is independent of other categories. Syntax elements are provided to Entropy Encoder 530 for incorporation into the video bitstream.

Figure 6:
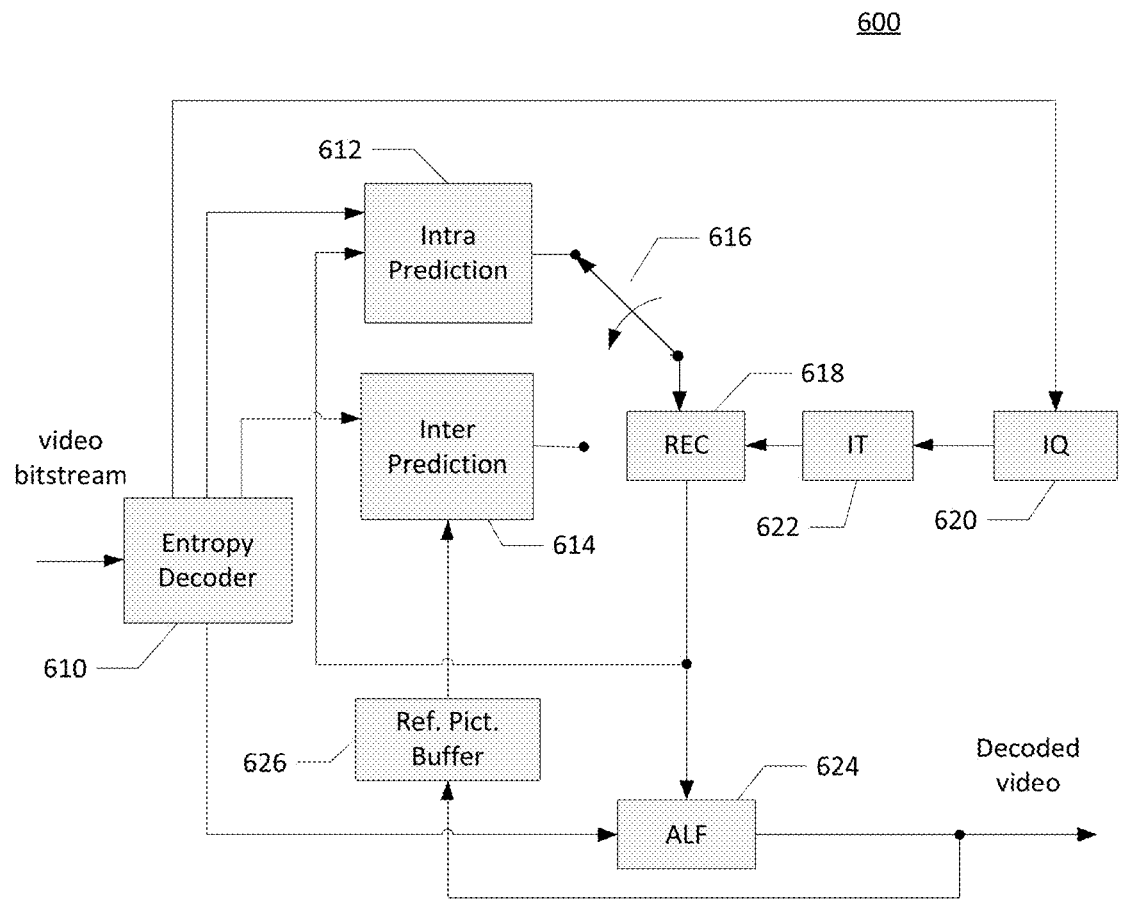
FIG. 6 illustrates an exemplary system block diagram for a video decoding system incorporating the video data processing method according to embodiments of the present invention.

A corresponding Video Decoder 600 for decoding the video bitstream generated by the Video Encoder 400 of FIG. 5 is shown in FIG. 6. The video bitstream is the input to Video Decoder 600 and is decoded by Entropy Decoder 610 to parse and recover the transformed and quantized residual signal and other system information. Entropy Decoder 610 parses coded transform coefficient levels of a current transform block. The decoding process of Decoder 600 is similar to the reconstruction loop at Encoder 500, except Decoder 600 only requires motion compensation prediction in Inter Prediction module 614. Each block is decoded by either Intra Prediction module 612 or Inter Prediction module 614. Switch 616 selects an intra predictor from Intra Prediction module 612 or Inter predictor from Inter Prediction module 614 according to decoded mode information. The transformed and quantized residual signal is recovered by Inverse Quantization module (IQ) 620 and Inverse Transformation module (IT) 622. The recovered residual signal is reconstructed by adding back the predictor in REC module 618 to produce reconstructed video. The reconstructed video is further processed by Adaptive Loop Filter (ALF) 624 to generate final decoded video. To process a current decoded slice or a current decoded picture with the ALF process according to some embodiments of the present invention, an APS ID of each referenced APS is parsed from a slice header of the current decoded slice or a picture header of the current decoded picture. The parsed APS ID together with an APS parameter type are used to determine each referenced APS. The APS parameter type is signaled in each APS indicating the type of data carried by the APS, and in this embodiment, the APS parameter type is ALF. The current decoded slice or picture is processed by the ALF process using the ALF parameters determined from the referenced APSs. If the currently decoded picture is a reference picture, the reconstructed video of the currently decoded picture is also stored in Ref. Pict. Buffer 626 for later pictures in decoding order.

Various components of Video Encoder 500 and Video Decoder 600 in FIG. 5 and FIG. 6 may be implemented by hardware components, one or more processors configured to execute program instructions stored in a memory, or a combination of hardware and processor. For example, a processor executes program instructions to control receiving of input data associated with a current transform block. The processor is equipped with a single or multiple processing cores. In some examples, the processor executes program instructions to perform functions in some components in Encoder 500 and Decoder 600, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 5 and 6, Encoder 500 and Decoder 600 may be implemented in the same electronic device, so various functional components of Encoder 500 and Decoder 600 may be shared or reused if implemented in the same electronic device. For example, one or more of Reconstruction 526, Inverse Transformation 524, Inverse Quantization 522, Adaptive Loop Filter (ALF) 528, and Reference Picture Buffer 532 in FIG. 5 may also be used to function as Reconstruction 618, Inverse Transformation 622, Inverse Quantization 620, Adaptive Loop Filter (ALF) 624, and Reference Picture Buffer 626 in FIG. 6, respectively.

Embodiments of the video data processing method performing a specific process on a current slice in a video coding system may be implemented in a circuit integrated into a video compression chip or program code integrated into video compression software to perform the processing described above. For examples, scaling transform coefficient levels in a current transform block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding video data in a video coding system, comprising:
receiving input data associated with a current slice;
parsing an Adaptive Parameter Set (APS) Identifier (ID) of each referenced APS from a slice header of the current slice for performing a specific process associated with only one category selected among multiple categories, wherein only the APSs classified under the only one category are referenced, wherein the multiple categories correspond to an Adaptive Loop Filter (ALF) process and a Luma Mapping Chroma Scaling (LMCS) process, wherein each APS referenced by the current slice is restricted to include corresponding data or parameters for the specific process associated with the only one category;
determining each referenced APS according to the parsed APS ID and the only one category associated with the specific process, wherein each available APS is classified into one of the multiple categories according to a data type of data carried in the APS, and the APS ID of one APS among each referenced APS is counted in the category only and is independent of other categories;
determining parameters of the specific process for the current slice by referencing one or more of the referenced APSs, wherein when the specific process corresponds to the ALF process, at least one of at least two flags among the parameters of the specific process is constrained to be equal to one;
performing the specific process on one or more blocks in the current slice using the parameters; and
decoding the current slice.

2. The method of claim 1, wherein the parameters of the ALF process are determined by referencing one or more APSs in a category associated with the ALF process and the parameters of the LMCS process are determined by referencing one or more APSs in a category associated with the LMCS process.

3. The method of claim 1, wherein all APSs in one category have a same APS parameter type and the APS parameter type of each referenced APS is parsed from the referenced APS.

4. The method of claim 3, wherein each referenced APS is searched by the APS ID parsed from the slice header and the APS parameter type associated with the specific process.

5. The method of claim 1, wherein the APS ID of each referenced APS is parsed from a slice header of the current slice or a picture header of a current picture, wherein the current slice is in the current picture.

6. An apparatus for performing video coding, comprising:
a computer processor configured for receiving video data; and programming executable on the computer processor for video coding by performing steps comprising:
receiving input data associated with a current slice;
signaling or parsing an APS Identifier (ID) of each referenced Adaptive Parameter Set (APS) from a slice header of the current slice for performing a specific process associated with only one category selected among multiple categories, wherein only the APSs classified under the only one category are referenced, wherein the multiple categories correspond to an Adaptive Loop Filter (ALF) process and a Luma Mapping Chroma Scaling (LMCS) process, wherein each APS referenced by the current slice is restricted to include corresponding data or parameters for the specific process associated with the only one category;
determining each referenced APS according to the signaled or parsed APS ID and the only one category associated with the specific process, wherein each available APS is classified into one of the multiple categories according to a data type of data carried in the APS, and the APS ID of one APS among each referenced APS is counted in the category only and is independent of other categories;
determining parameters of the specific process for the current slice by referencing one or more of the referenced APSs, wherein when the specific process corresponds to the ALF process, at least one of at least two flags among the parameters of the specific process is constrained to be equal to one;

performing the specific process on one or more blocks in the current slice using the parameters; and encoding or decoding the current slice.

7. The apparatus of claim 6, wherein the parameters of the ALF process are determined by referencing one or more APSs in a category associated with the ALF process and the parameters of the LMCS process are determined by referencing one or more APSs in a category associated with the LMCS process.

8. The apparatus of claim 6, wherein all APSs in one category have a same APS parameter type and the APS parameter type of each referenced APS is parsed from the referenced APS.

9. The apparatus of claim 8, wherein each referenced APS is searched by the APS ID parsed from the slice header and the APS parameter type associated with the specific process.

10. The apparatus of claim 6, wherein the APS ID of each referenced APS is parsed from a slice header of the current slice or a picture header of a current picture, wherein the current slice is in the current picture.

11. The method of claim 1, further comprising checking if each APS referenced by the current slice includes corresponding data or parameters for the specific process, and modifying or removing the APS ID of any APS without corresponding data or parameters from the slice header of the current slice, wherein the step of determining each referenced APS according to the parsed APS ID and the only one category associated with the specific process is performed after at least one of the checking, modifying and removing steps.

12. The method of claim 1, wherein said at least two flags among the parameters of the specific process correspond to at least a flag related to luma and at least a flag related to chroma.

* * * * *